March 12, 1968  L. WEISS ET AL  3,372,873
VORTEX PRODUCING APPARATUS

Filed June 24, 1966

March 12, 1968 L. WEISS ET AL 3,372,873
VORTEX PRODUCING APPARATUS
Filed June 24, 1966 6 Sheets-Sheet 2

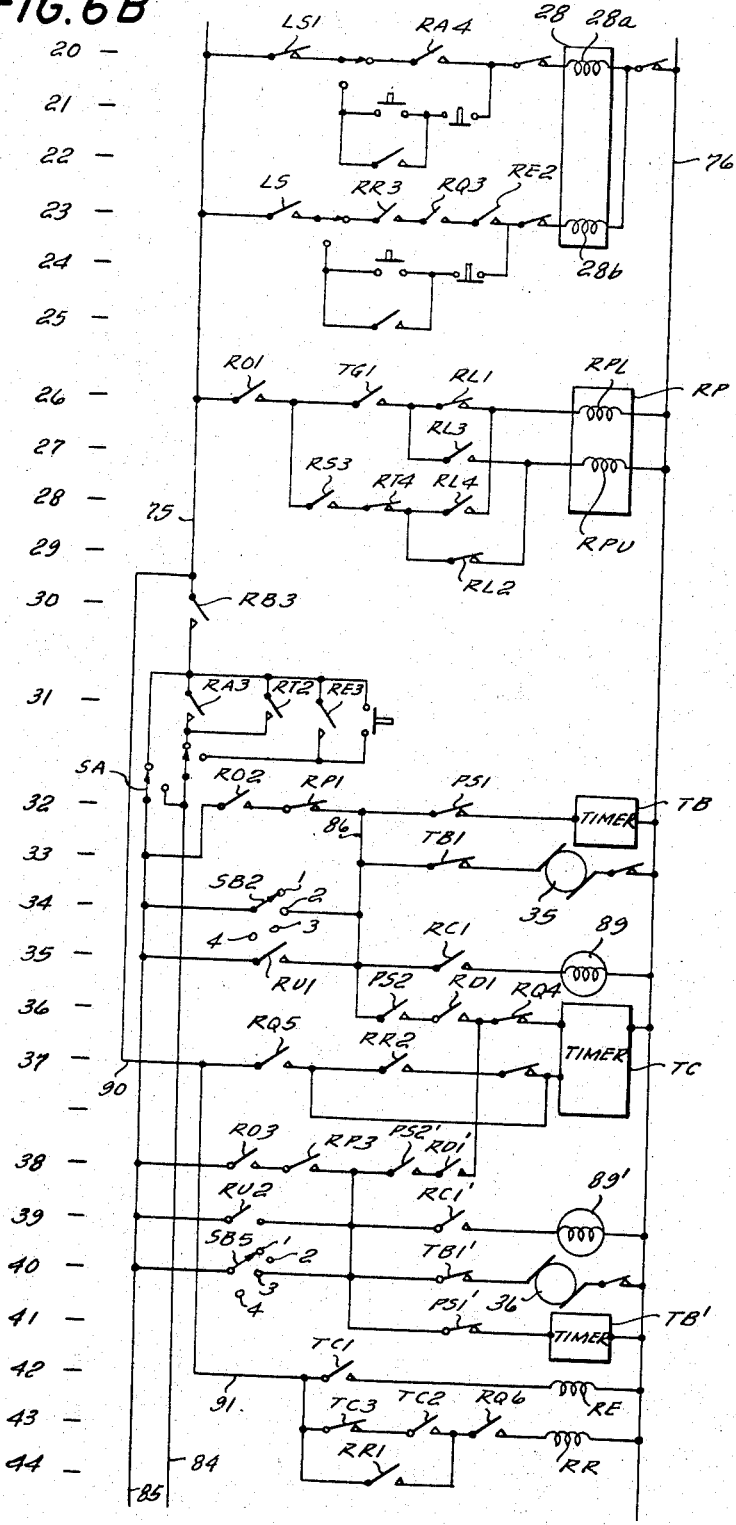

FIG. 6C

United States Patent Office 3,372,873
Patented Mar. 12, 1968

3,372,873
VORTEX PRODUCING APPARATUS
Leonard Weiss, 8721 Bay Parkway, Brooklyn, N.Y. 11214, and Theodore B. Meyerstein, 166—10 Powels Cove Blvd., Beechhurst, N.Y.
Filed June 24, 1966, Ser. No. 560,329
20 Claims. (Cl. 239—99)

This invention relates to vortex producing apparatus and more particularly to apparatus for producing a vortical ring of fluid.

The present invention, while of general application, is particularly well suited for use in advertising displays, etc., to repetitively produce a well-defined fluid vortex. The vortex customarily is of annular configuration and is commonly referred to as a smoke ring. The apparatus of the invention also may be employed as a testing device, to facilitate the evaluation of the effect of a known turbulence on electromagnetic radiation, including radar and radio signals, or on lasers or other coherent optical energy. Still another application for apparatus of this type is to transmit materials in suspension from one point to another, as in firefighting equipment, for example.

The various apparatus previously employed for the production of a vortex ring have exhibited several disadvantages. As an illustration, in many types of apparatus used heretofore the resulting rings were insufficient in size for the intended purpose. In addition, difficulties often were encountered in accurately and automatically controlling the movable portions of the apparatus in proper sequence to insure the formation of a well-defined ring. Furthermore, such prior apparatus frequently has proved deficient in the repetitive formation of successive rings and in the projection of the rings for an appreciable distance.

One general object of this invention, therefore, is to provide new and improved apparatus for producing a ring vortex.

More specifically, it is an object of this invention to provide such apparatus in which the size of the vortex and the distance over which it is projected are substantially increased.

Another object of this invention is to provide apparatus of the character indicated in which the various control functions of the apparatus are performed automatically and in proper sequence.

Still another object of this invention is to provide apparatus for producing successive vortex rings which utilizes comparatively simple mechanical and electrical components and is economical to manufacture and thoroughly reliable in operation.

In one illustrative embodiment of this invention, an apparatus for producing a vortex ring comprises an enclosure of generally cylindrical configuration which is open at one end and includes a sharp-edged orifice at the other end. A support member is positioned within the enclosure and is arranged for movement with respect thereto toward the orifice. This support member carries a piston element of unique construction and arrangement. Upon the insertion of a suitable visible vapor or other vortex producing material into the enclosure between the element and the orifice, the support member is rapidly and automatically moved toward the orifice to expel the material therefrom in the form of a vortex ring.

In accordance with one feature of this invention, the element carried by the support member comprises a flexible diaphragm. The support member is effective to move the diaphragm toward the orifice in a generally linear direction and to then abruptly bring it to a stop, thereby flexing the diaphragm. With this arrangement, the vortex ring emanating from the orifice is extremely well defined and may be projected a substantial distance therefrom.

In accordance with another feature of the invention, in certain advantageous arrangements, means are provided for automatically returning the support member to its initial position following the generation of the ring. As the support member reaches this position, the sequence of operation is automatically repeated to produce a succeeding ring.

In accordance with still another feature of the invention, in several good embodiments, the apparatus is controlled by a unique circuit arrangement which insures the completion of each particular function before the initiation of the succeeding function. As an illustration, these embodiments include various circuit controlling devices for positively preventing movement of the support member toward the orifice until the member has been returned to its initial position following the generation of the preceding ring and additional ring producing material has been inserted in the enclosure. The arrangement is such that the inadvertent operation of the apparatus in a sequence other than the intended sequence, with the resulting possibility of injury to the operating personnel or damage to the apparatus, is avoided at all times.

The present invention, as well as further objects and features thereof, will be understood more clearly and fully from the following detailed description of a preferred embodiment, when read in conjunction with the accompanying drawings, in which:

FIGURES 6A, 6B, 6C and 6D collectively constitute a wiring diagram showing the control circuit for the apparatus.

Figure 1:
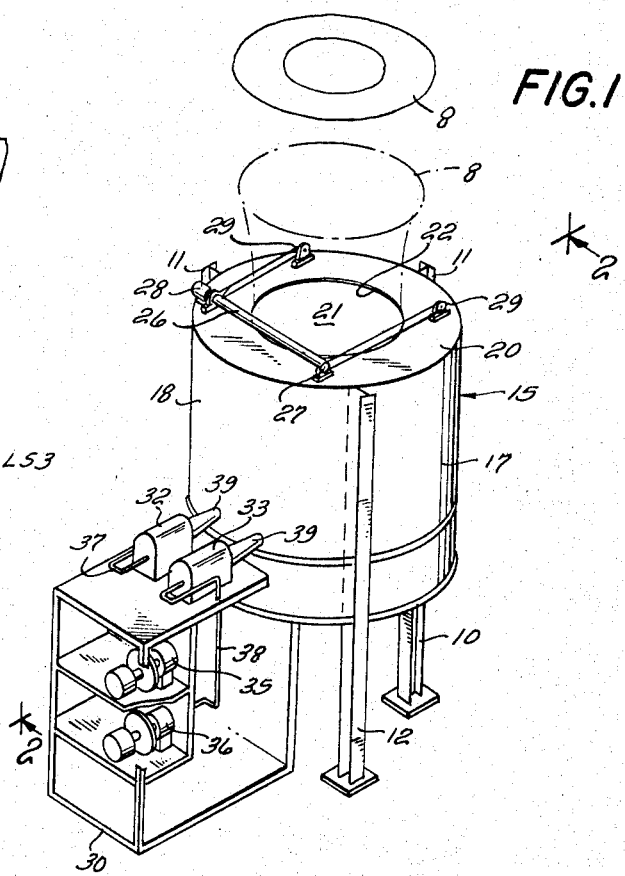
FIGURE 1 is a perspective view of an apparatus for producing a ring vortex in accordance with one illustrative embodiment of the invention.

Referring to FIGURE 1, there is shown an apparatus for producing successive vortex rings indicated generally at 8. The rings 8 comprise highly rotational, well defined gaseous areas of annular configuration which are projected upwardly about a vertical axis to a distance which illustratively is of the order of one hundred and fifty feet or even higher. In the illustrated embodiment, the rings have an external diameter of approximately ten feet and are automatically discharged from the apparatus at twenty-second intervals. Vaporized particles of a suitable hydrocarbon may be suspended in the rings to facilitate their visibility.

Figure 3:
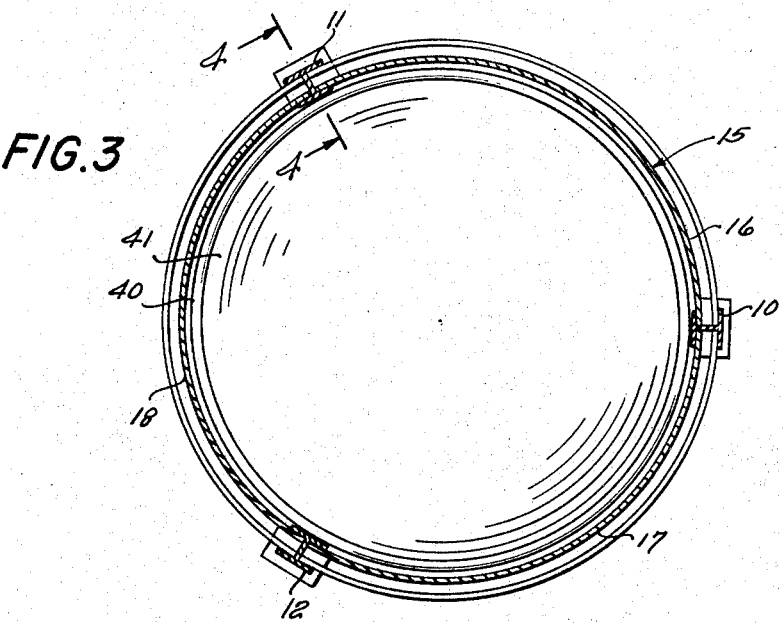
FIGURE 3 is a horizontal sectional view taken along the line 3—3 in FIGURE 2.

The apparatus for producing the rings 8 includes three upstanding support members 10, 11 and 12. These support members illustratively comprise H-beams and are firmly anchored to the ground at their lower ends. The upper portions of the members 10, 11 and 12 support a hollow cylindrical enclosure 15 and are rigidly affixed thereto at equally spaced intervals. As best shown in FIGURE 3, the enclosure 15 is fabricated from three arcuate sections 16, 17 and 18 which are secured adjacent their facing edges to the inner flanges of the corresponding support members. The enclosure 15 is open at its lower end, while the upper end is partially closed by a horizontally extending annular top plate 20. The plate 20 is provided with a large circular orifice 21 which is coaxial with the enclosure 15. This orifice is defined by a sharp knife edge 22 on the plate 20 and comprises the opening through which the successive vortex ring 8 are discharged.

The orifice 21 may be closed, as during inclement weather, for example, by a canvas awning 26. This awning 26 is supported on a horizontally extending roller 27 which is mounted on the top plate 20. The awning is operated by an A.C. motor 28 and pulleys 29 to draw the awning across the orifice.

Mounted on a frame 30 adjacent one side of the cylindrical enclosure 15 are two fogging units 32 and 33. The units 32 and 33 are of conventional construction and illustratively are of the type available commercially from the Todd Products Division of Todd Shipyards Corporation, Brooklyn, N.Y., Model TIFA SF–50. The fuel for the units 32 and 33 comprises natural gas which is premixed with air by blowers 35 and 36, respectively. These blowers are mounted on the frame 30 immediately beneath the fogging units and are connected thereto by lines 37 and 38. As will be understood, each of the fogging units includes a burner (not visible in the drawings) having a pilot flame which is supplied with gas through a pilot valve to initiate combustion. A main gas valve is then opened to ignite the burner, and water under pressure is led to the fogging unit from a suitable pump and is converted by the burner into steam. The steam is mixed with atomized particles of oil or other fog solution in the outlet nozzle 39 of the fogger. The solution is stored in an underground tank which is connected by a pump to the using tank leading to the fogger. The nozzle 39 protrudes into the cylindrical side wall of the enclosure 15 and is effective to introduce dense clouds of steam and oil particles into the enclosure, in a manner that will become more fully apparent hereinafter.

Figure 4:
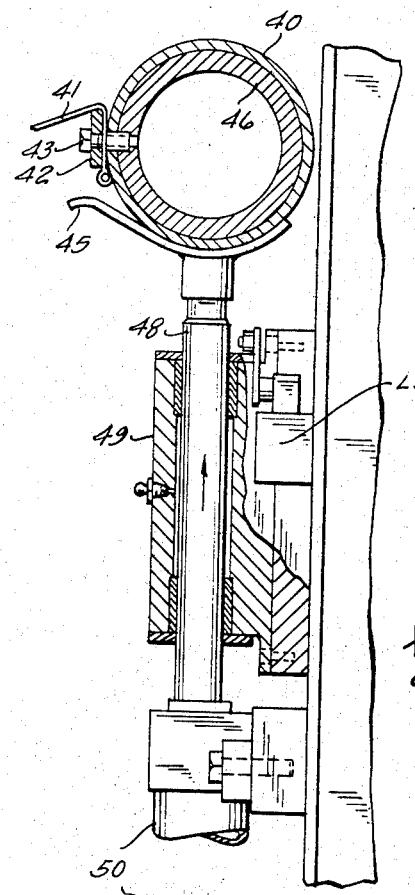
FIGURE 4 is an enlarged fragmentary sectional view taken along the line 4—4 in FIGURE 3, with certain parts shown in elevation and broken away.
Figure 2:
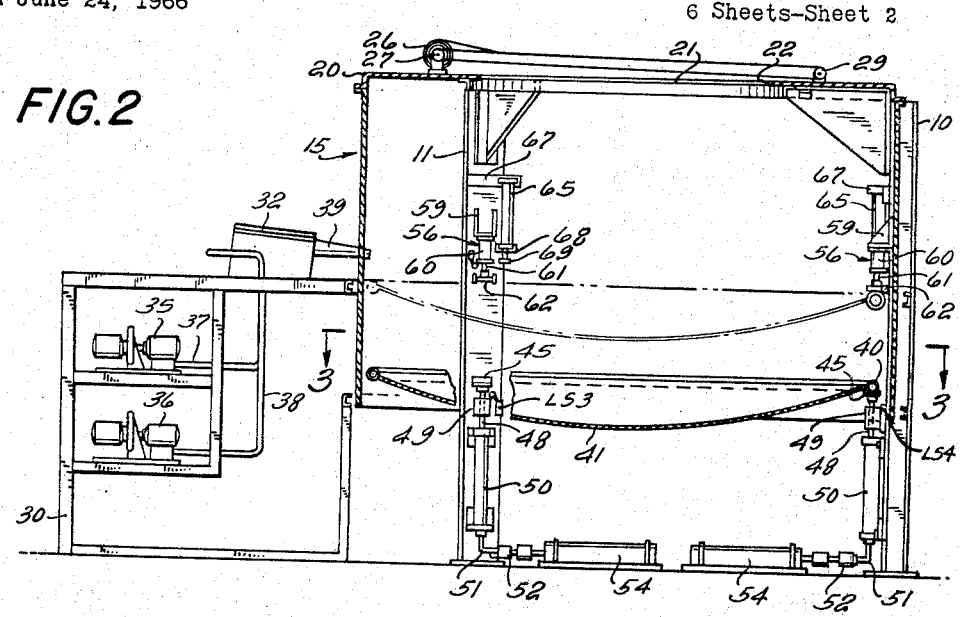
FIGURE 2 is a vertical sectional view taken generally along the line 2—2 in FIGURE 1, with certain portions of the apparatus shown in elevation.

Movably supported within the cylindrical enclosure 15 is a ring-shaped member 40 (FIGURE 2). The member 40 is of tubular construction and advantageously is fabricated from aluminum or other light weight material. A circular flexible piston or diaphragm 41 is carried by the member 40 and extends horizontally thereacross. The diaphragm 41 comprises a woven textile fabric, illustratively "Dacron," and as best shown in FIGURE 4 is secured adjacent its periphery to the inwardly facing portion of the ring 40 by an annular band 42 and bolts 43.

The ring-shaped member 40 is supported by three equally spaced saddles 45 adjacent the H-beams 10, 11 and 12. A stiffening sleeve 46 is disposed within the member 40 immediately above each of the saddles 45 to provide reinforcement. Each saddle is affixed to a downwardly extending piston 48 which is reciprocably mounted within a block 49 carried by the inner flange of the corresponding beam. The lower portion of the piston 48 is disposed within a hydraulic cylinder 50 similarly carried by the beam immediately beneath the block 49. The cylinder 50 is connected by a conduit 51 and a quick-opening valve 52 (FIGURE 2) to a hydraulic accumulator 54 which contains suitable hydraulic fluid supplied from an underground storage tank (not shown). The apparatus includes three of the accumulators 54, one for each of the three saddles 45. In a manner that will become more fully apparent hereinafter, at a predetermined point in the operation cycle the associated valves 52 are simultaneously opened to actuate the corresponding pistons 48 and rapidly move the ring-shaped member 40 and its attached diaphragm 41 from the full line position shown in FIGURE 2 to the dotted line position.

Figure 5:
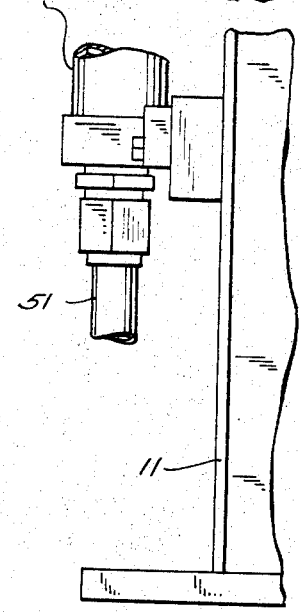
FIGURE 5 is an enlarged fragmentary detail view of a portion of the apparatus shown in FIGURE 2.
Figure 5:
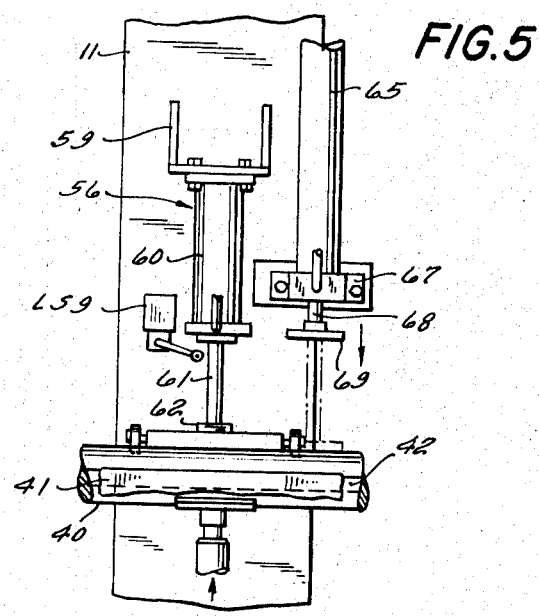

Supported on the inner flanges of the beams 10, 11 and 12 immediately above the dotted line position of the ring-shaped member 40 are three shock absorbers indicated generally at 56. These shock absorbers are in vertical alignment with the pistons 48 and are held in place by suitable brackets 59. As best shown in FIGURE 5, each absorber includes a hydraulic cylinder 60 which carries a piston 61. The lower end of the piston 61 is provided with a foot 62 in position to engage the adjacent upper portion of the member 40 and thereby rapidly bring the member to rest as it reaches the upper end of its stroke.

An air-operated cylinder 65 is affixed by a bracket 67 to the inner flange of each of the beams 10, 11 and 12 immediately adjacent the shock absorber 56. The cylinder 65 is provided with a piston 68 having a foot 69 at the lower end thereof. In its normal, retracted position, the foot 69 is disposed at a level slightly above that of the shock absorber foot 62. Upon the introduction of air under pressure into the cylinder 65, however, the piston 68 is moved downwardly to bring the foot 69 into engagement with the adjacent portion of the ring-shaped member 40, as shown by dotted lines in FIGURE 5. As the foot 69 continues its downward movement, the member 40 is returned to the full line position of FIGURE 2.

Referring to FIGURES 6A–6D, the various electrical devices and circuits and certain related control elements will now be described. To form the complete circuit diagram, these figures should be placed end-to-end with their major length vertical. The individual circuits for controlling the apparatus extend horizontally in FIGURES 6A–6D, and to facilitate their identification each horizontal line has been numbered sequentially.

The control circuit includes two conductors 75 and 76 which are supplied with suitable alternating current signal, illustratively one hundred and twenty volts. To initiate operation of the apparatus, a manually controlled start button 77 (FIGURE 6A, line 1) is actuated to connect the winding of a relay RA across these conductors and to turn on lamps 78. The relay RA is thus energized to close its normally open contacts RA1 (line 4), RA2 (line 7), RA3 (FIGURES 6B, line 31) and RA4 (line 20). The closing of the contacts RA1 completes a holding circuit across the button 77 to maintain the relay in an energized condition. Upon the closing of the contacts RA2, current is supplied to a start cycle timer TA. As the timer TA begins its cycle, it closes contacts TA1 (line 8) to complete a holding circuit therefor through conductors 79 and 80 leading to the conductor 75. Closure of the contacts RA3 is effective to condition the burner control circuits for the foggers 32 and 33 in a manner that will become more fully apparent hereinafter.

The closure of the relay contacts RA4 connects the open winding 28a (line 20) of awning motor 28 across the conductors 75 and 76. Upon energization of the winding 28a, the roller 27 (FIGURE 1) is actuated by the motor 28 to withdraw the awning 26 from its position across the orifice 20. As the awning begins its movement, it closes a normally open limit switch LS (line 23), to partially complete a circuit for the close winding 28b of the motor, and when the awning approaches its fully withdrawn position it opens a normally closed limit switch LS1 (line 20) to de-energize the open winding 28a and thus shut down the motor.

A limit switch LS2 (FIGURE 6A, line 13) also is controlled by the awning 26. The switch LS2 is normally open but is closed upon the movement of the awning to its fully withdrawn position to connect the winding of a relay RB across the conductors 75 and 76. Upon the energization of the relay RB, its normally closed contacts RB1 (line 7) are opened to disconnect the circuit through the contacts RA2 to the start cycle timer TA. The timer TA continues to time, however, through the holding circuit including the contacts TA1 and the conductors 79 and 80.

The relay RB additionally includes normally open contacts RB2 (line 18). Upon the closing of these contacts in response to energization of the relay winding, a fog solution pump motor 82 and a hydraulic pump motor 83 are connected across the conductors 75 and 76. The motor 82 is effective to pump the fog solution from the underground tank (not shown) to the using tank, and this latter tank is provided with a normally closed float switch FS1 which opens when the solution in the tank has reached the desired level, thereby disconnecting the motor 82. The motor 83 serves to pump hydraulic fluid into the accumulator tanks 54 (FIGURE 2). At the time the hydraulic pressure builds up to the desired level, a pressure switch PS (FIGURE 6D, line 65) closes to condition the system for the insertion of the fogging solution.

Energization of the relay RB also closes normally open contacts RB3 (FIGURE 6B, line 30) to connect the conductor 75 through the now closed relay contacts RA3 to a conductor 84 and through a manually operable switch SA (line 32) to a conductor 85, thereby energizing a control circuit for the foggers 32 and 33. This circuit includes a relay RO (FIGURE 6D, line 84) which is connected across the conductors 76 and 84 through manually operable switch contacts SB1. The relay RO is energized to close its normally open contacts RO1 (FIGURE 6B, line 26), RO2 (line 32), RO3 (line 38), RO4 (FIGURE 6C, line 46), RO5 (line 58), RO6 (line 61) and RO7 (line 62). The closing of the contacts RO2 completes a circuit for the fogger 32 which extends from the conductors 75 and 85, the contacts RO2, a set of closed contacts RP1, a conductor 86, a closed pressure switch PS1 (line 32) and a blower timer TB to the conductor 76, thereby initiating operation of the timer. Simultaneously, the motor for the blower 35 (line 33) is energized through a parallel circuit including the closed timer contacts TB1 connected to the conductor 86.

Figure 6A:
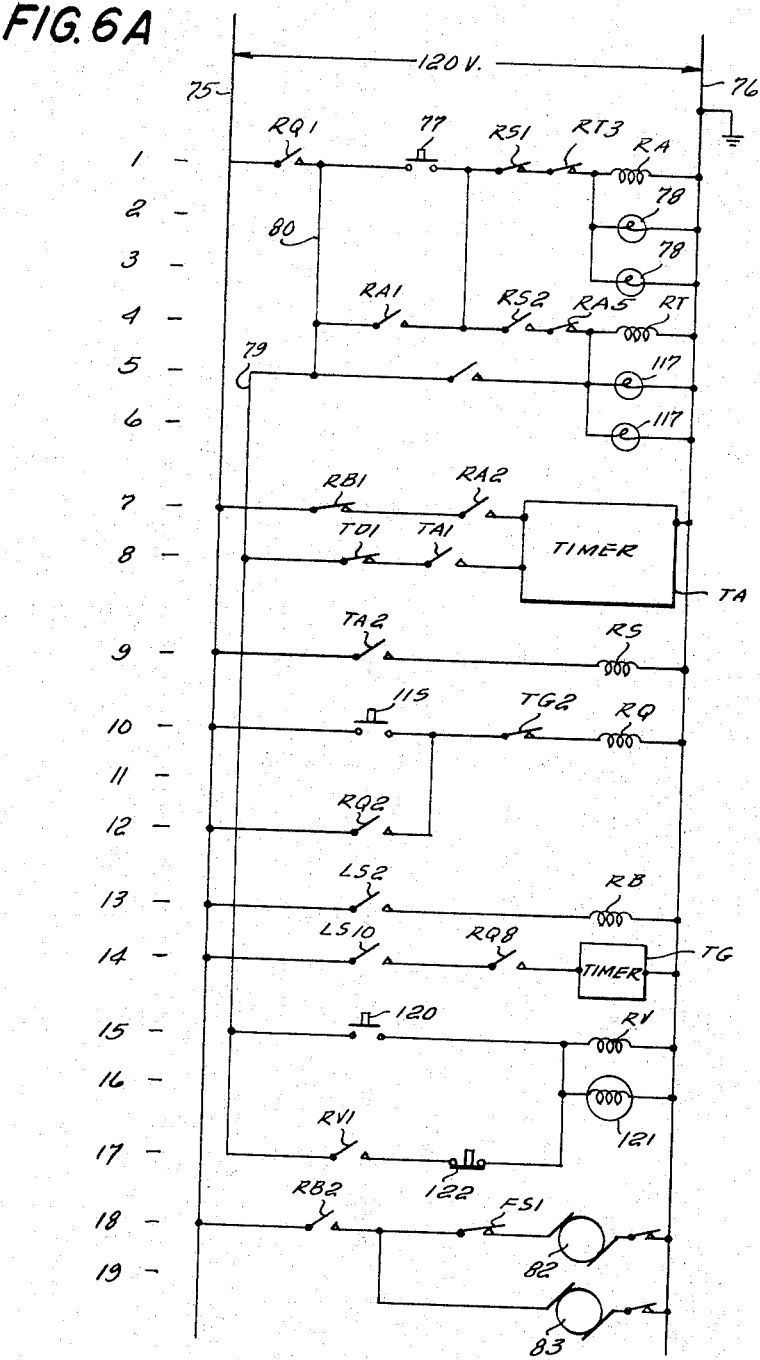
Figure 6C:
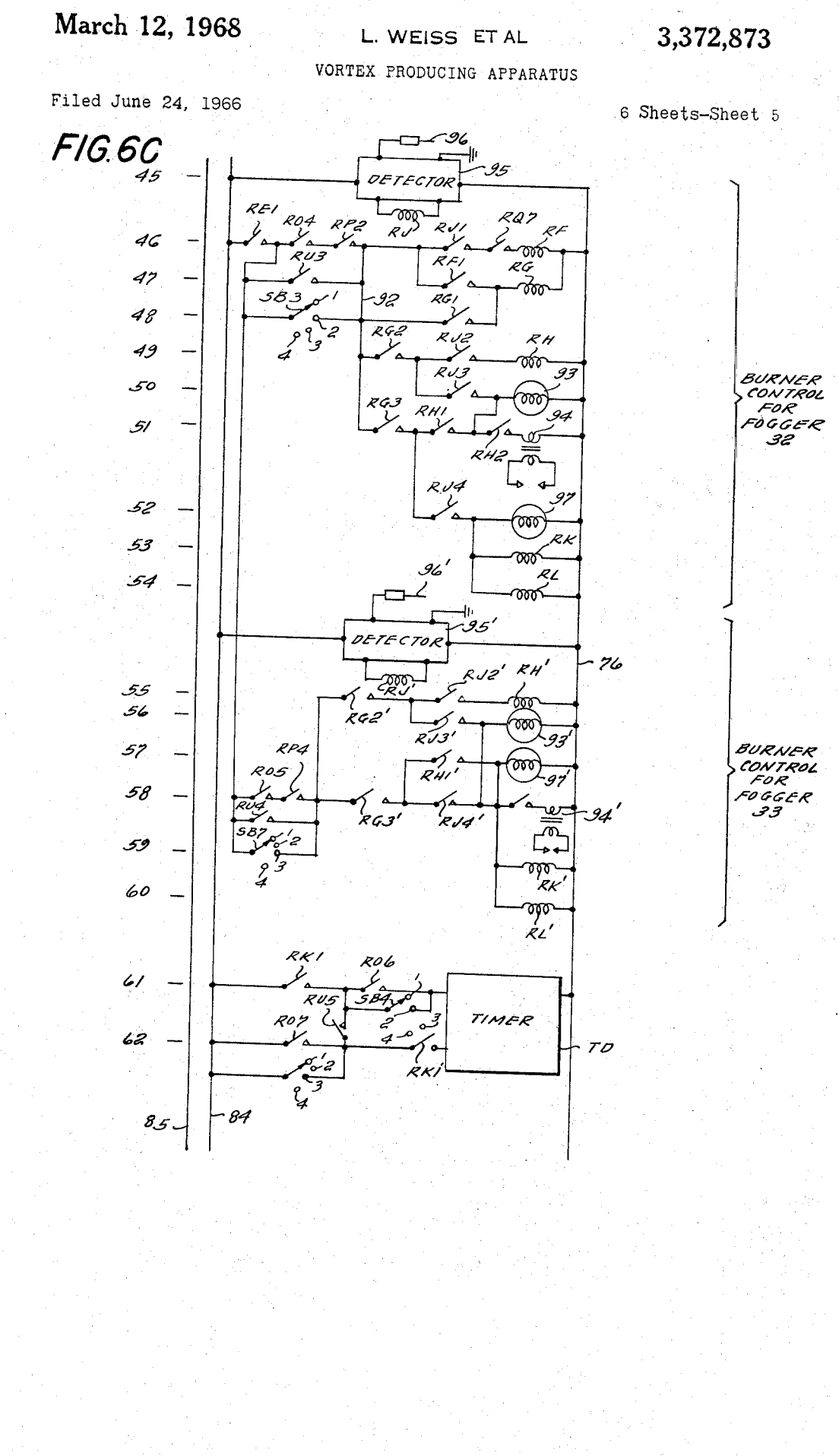
Figure 6D:
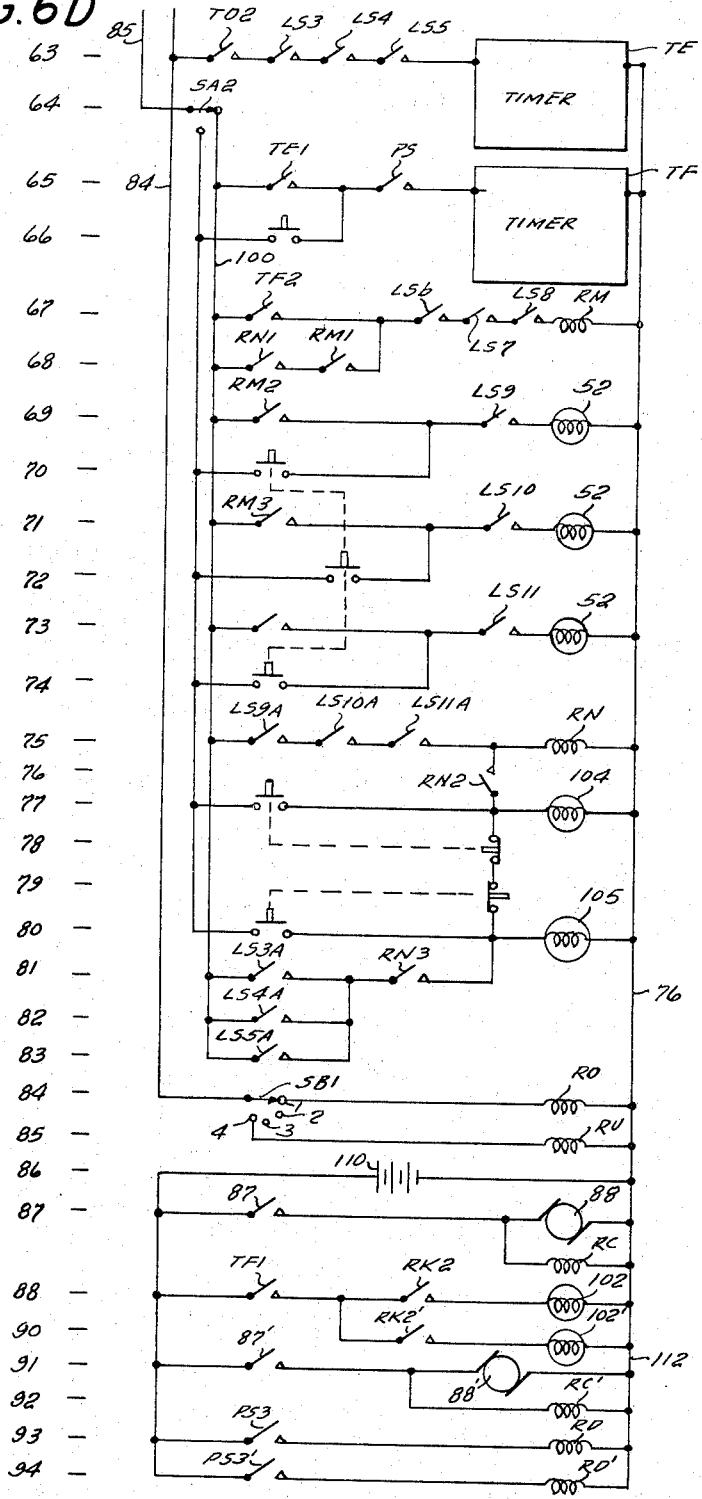

As the blower 35 begins to rotate, it closes normally open contacts 87 (FIGURE 6D, line 87). The contacts 87 are located in a separate electrical circuit which includes a D.C. voltage source 110 (line 86) connected across two conductors 111 and 112. One of the contacts 87 is connected to the conductor 111, while the other contact leads to the common terminal of a water pump motor 88 and a relay RC (line 88). The opposite terminals of the motor 88 and the relay RC are connected to the conductor 111. Upon the closing of the contacts 87, the pump for the motor 88 pumps water to the fogger 32, while the relay RC is energized to close its normally open contacts RC1 (FIGURE 6B, line 35), thereby supplying current to the coil of a water valve 89 to open the valve.

As the air pressure from the blower 35 builds up, a pressure switch PS2 (line 36) closes, and the pressure switch PS1 (line 32) opens to break the circuit for the timer TB. In cases in which satisfactory pressure is not developed by the blower, the switch PS1 remains closed to permit the timer TB to complete its timing cycle and open the contacts TB1 after a predetermined time, thereby disconnecting the blower. Upon the build-up of water pressure by the pump for the motor 88, a pressure switch PS3 (FIGURE 6D, line 93) is closed to connect the winding of a relay RD across the conductors 111 and 112. Energization of the relay RD is effective to close its normally open contacts RD1 (FIGURE 6B, line 36). With satisfactory air pressure and satisfactory water pressure, the closure of the contacts RD1 completes a circuit from the conductor 85, the closed relay contacts RO2 and RP1, the conductor 86, the pressure switch PS2 and the contacts RD1 to a purge timer TC.

The purge timer TC operates for a length of time sufficient to enable the air from the blower 35 to remove any combustible gases, etc., from the fogger 32. Upon the completion of its timing cycle, the timer TC closes normally open timing contacts TC1 (line 42) to complete a circuit which extends from the conductor 75, along two conductors 90 and 91 and across the contacts TC1 to the winding of a relay RE. The relay RE is energized to close normally open contacts RE1 (FIGURE 6C, line 46), RE2 (line 23) and RE3 (line 31). The closure of the contacts RE1 is effective to actuate the flame unit in the burner control circuit for the fogger 32. Thus, a circuit is completed from the conductor 84 across the contacts RE1 to the now closed contacts RO4, the closed contacts RP2, RH1 and RQ7, and then across the winding of a time delay relay RF to the conductor 76. After a predetermined time interval, the relay RF closes its normally open contacts RF1 (line 47) to energize the winding of a safe start relay RG. This latter relay includes three sets of normally open contacts RG1 (line 48) RG2 (line 49) and RG3 (line 51). The closure of the contacts RG1 completes a holding circuit for the relay RG through a conductor 92 and the closed contacts RP2, RO4 and RE1 leading to the conductor 84, while the closure of the contacts RG2 is effective to energize a relay RH (line 49). The closure of the contacts RG3 connects the conductor 92 to the ignition and gas valve circuitry for the fogger 32.

Upon energization of the relay RH, two sets of normally open contacts RH1 and RH2 (line 51) are closed to complete a circuit from the now-closed relay contacts RG3 to a gas pilot valve 93 and an ignition transformer 94, thus opening the valve and lighting the pilot flame. The flame is detected by a detector circuit 95 (line 45) which is connected across the conductors 76 and 84. The circuit 95 includes a flame rod 96 of conventional construction which senses the pilot flame and actuates the circuit to energize the winding of a relay RJ. The relay RJ is provided with normally closed contacts RJ1 (line 46) and RJ2 (line 49) and normally open contacts RJ3 (line 50) and RJ4 (line 52).

The opening of the contacts RJ1 in response to the energization of the relay RJ breaks the circuit for the time delay relay RF to open the contacts RF1 leading to the safe start relay RG. The relay RG remains in its energized condition, however, because of the holding circuit through the contacts RG1. Energization of the relay RJ also opens the contacts RJ2 to de-energize the relay RH, thus opening the contacts RH1 and RH2 to disconnect the ignition transformer 94. Simultaneously, the contacts RJ3 are closed to hold the gas pilot valve 93 in its open position, while the contacts RJ4 are closed to complete a circuit for a main gas valve 97 (line 52) and two relays RK and RL (lines 53 and 54). Upon the opening of the valve 97, gas is admitted to the burner for the fogger 32 to light the main flame.

With the main flame ignited for the fogger 32, energization of the relay RK closes its normally open contacts RK1 (line 61) and RK2 (line 89). The closure of the contacts RK1 completes a circuit to a steam timer TD through the conductor 84, the contacts RK1 and the now closed relay contacts RO6. At the start of its timing cycle, the timer TD opens normally closed timing contacts TD1 (line 8) to disconnect the start cycle timer TA. A predetermined time interval thereafter, the timer TD closes normally open timing contacts TD2 (line 63) which are connected in a series circuit leading to a puffing cycle timer TE. Also connected in this circuit are three limit switches LS3, LS4 and LS5. These limit switches are respectively associated with the three hydraulically operated pistons 48 (FIGURES 2 and 4) and are closed only in cases in which the corresponding pistons are in their fully retracted, lowermost positions, indicating that the ring-shaped member 40 and its attached diaphragm 41 are in position (the full line position of FIGURE 2) to initiate the formation of a vortex ring. With this arrangement, the possibility of the actuation of the member 40 prior to its return to the proper starting position following the generation of the preceding ring is positively prevented at all times.

As the puffing cycle timer TE begins to time following the closure of the contacts TD2, the timer closes its normally open timing contacts TE1 (line 65) to complete a circuit from the conductor 85, manually operable switch contacts SA2, a conductor 100, the contacts TE1 and the now-closed hydraulic pressure switch PS to a fog timer TF. The timer TF includes two sets of normally open contacts TF1 (line 89) and TF2 (line 67). Upon the closure of the contacts TF1, a circuit is completed from the conductor 111 through the relay contacts RK2 to a fog valve 102, thereby opening the valve to introduce the fogging solution through the fogger 32 into the cylindrical enclosure 15 (FIGURE 1).

The timing contacts TF2 (line 67) are connected across the conductors 100 and 76 in series with three limit switches LS6, LS7 and LS8 and the winding of a relay RM. The limit switches LS6, LS7 and LS8 are respectively associated with the three pneumatically operated pistons 68 (FIGURE 5) and are maintained closed only when the pistons are in their uppermost, fully retracted positions. The arrangement is such that the energization of the relay RM is positively prevented in cases in which any one of the pistons 68 is in a position other than its proper starting position.

Energization of the relay RM in response to the closing of the timing contacts TF2 is effective to close normally open relay contacts RM1 (line 68), RM2 (line 69), RM3 (line 71) and RM4 (line 73). Closure of the contacts RM1 bypasses the fog timer contacts TF2 and maintains the relay RM in its energized condition. When the timer TF completes its cycle, the contacts TF1 (line 89) open to close the fog valve 102. The closure of the contacts RM2, RM3 and RM4 opens the three quick-opening valves 52 to admit hydraulic fluid from the accumulator tanks 54 (FIGURE 2) to the cylinders 50. Each of the pistons 48 within these cylinders is thereupon rapidly urged in an upward direction to similarly drive the ring-shaped member 40 toward the sharp-edged orifice 21. The flexible diaphragm 41 on the member 40 likewise is moved toward the orifice to expel the air and fogging solution within the enclosure 15 in the form of an extremely well-defined vortex ring. This ring is projected upwardly in an axial direction with respect to enclosure 15 for an appreciable distance. At the time the pistons 48 begin their upward movement, the limit switches LS3, LS4 and LS5 (line 63) open to disconnect the puffing cycle timer TE.

As the ring-shaped member 40 approaches the termination of its upward movement, it is engaged by the feet 62 on the three shock absorbers 56. The fluid within the shock-absorbing cylinders 60 is effective to abruptly arrest the upward movement of the member 40 and its attached diaphragm 41. The shock absorbers 56 are respectively provided with limit switches LS9 (FIGURE 5 and FIGURE 6D, line 69), LS10 (FIGURE 6D, line 71) and LS11 (FIGURE 6D, line 73). These limit switches are normally closed but are opened as the pistons 61 within the cylinders 60 reach their uppermost positions to break the circuits for the corresponding quick-opening valves 52, thereby closing the valves to prevent further introduction of fluid into the hydraulic cylinders 50.

The movement of the three shock-absorbing pistons 61 to their uppermost positions also is effective to close normally open limit switches LS9A, LS10A and LS11A (line 75), thus connecting the winding of a relay RN across the conductors 100 and 76. Upon energization of this relay, normally closed contacts RN1 (line 68) are opened to break the circuit for the relay RN, and normally open contacts RN2 (line 76) are closed to actuate valves 104 (line 77) and 105 (line 80). The valves 104 and 105 are respectively associated with the hydraulic cylinders 50 (FIGURE 4) and the air-operated cylinders 65 (FIGURE 5). Actuation of the valve 104 permits the return of the pistons 48 within the cylinders 50 to their initial positions, while actuation of the valve 105 introduces air under pressure into the cylinders 65 to drive the pistons 68 downwardly from the full line position shown in FIGURE 5 to the dotted line position. The ring-shaped member 40 and its attached diaphragm 41 similarly are moved in a downward direction preparatory to the discharge of a succeeding vortex ring.

Energization of the relay RN additionally closes normally open contacts RN3 (line 81). One of these contacts is connected through the contacts RN2 to the relay winding while the other contact leads through a parallel circuit comprising the limit switches LS3A, LS4A and LS5A to the conductor 100. The limit switches LS3A, LS4A and LS5A are normally closed but are opened when the respective hydraulic pistons 48 are in their lowermost positions. The arrangement is such that the relay RN is maintained in its energized condition until each of the three pistons 48 has returned to its proper starting position.

As the limit switches LS3, LS4 and LS5 (line 63) close in response to the return of the ring-shaped member 40 and its associated pistons, the timer TE again begins its timing cycle to initiate operation of the timer TF. The timer TF closes the contacts TF1 (line 89) to introduce the fogging solution from the fogger 32 into the enclosure 15. In response to the insertion of the fogging solution, the timer contacts TF2 (line 67) close to energize the relay RM in the manner described above. Upon the energization of this relay, the ring-shaped member 90 again moves from its initial position toward the circular orifice 21 to automatically discharge a succeeding vortex ring therefrom.

The apparatus continues to repeatedly generate successive vortex ring through the use of the fogging unit 32 until the operation of a manually controlled stop button 115 (FIGURE 6A, line 10). Upon the actuation of this button, a circuit is completed across the winding of a relay RQ. As the relay RQ is energized, it opens normally closed relay contacts RQ1 (line 1) to interrupt the circuit for the relay RA, thereby opening the holding circuit contacts RA1 (line 4), the contacts RA2 (line 7) leading to the start cycle timer TA, the burner control circuit contacts RA3 (line 31), and the contacts RA4 (line 20) on the circuit for the open winding 28a of the awning motor 28.

Energization of the stop relay RQ also is effective to close normally open contacts RQ2 (line 12) and RQ3 (line 23). The closure of the contacts RQ2 completes a holding circuit for the relay winding, while the closure of the contacts RQ3 partially completes a circuit leading to the close coil 28b of the awning motor 28. Additional contacts RQ4 (line 36) of the relay RQ are normally closed but are opened upon the energization of the relay to disconnect the purge timer TC. The timer TC is reset and again begins its cycle a short interval thereafter upon the closing of delayed-action contacts RQ5 (line 37) of the relay RQ.

Energization of the relay RQ additionally closes its normally open contacts RQ6 (line 43) and RQ7 (line 46) and opens its normally closed contacts RQ8 (line 14). As the timer TC begins its timing cycle, it closes contacts TC2 to complete a circuit through the contacts RQ6 to the winding of the relay RR. This latter relay includes normally open contacts RR1 (line 44), RR2 (line 37) and RR3 (line 23). The closure of the contacts RR1 in response to the energization of the relay RR bridges the timer contacts TC2 as well as the normally closed timer contacts TC3, to complete a holding circuit for the relay winding, while the closure of the contacts RR2 completes a holding circuit for the timer TC. The closure of the contacts RR3 is effective to further partially complete the circuit for the awning motor winding 28b.

During this portion of the operating cycle, the fog solution pump motor 82 (line 18), the hydraulic pump motor 83 (line 19), the blower 35 (line 33) and the water pump motor 88 (line 87) continue to operate, and the water valve 89 (line 35) remains open. The apparatus is thus effective to complete the particular puffing cycle in process at the time the stop button 115 was actuated. The timer TC maintains the blower 35 in operation for a length of time sufficient to purge combustible gases, etc. from the fogger 32.

As the timer TC completes its timing cycle to end the purge period, the timer contacts TC1 (line 42) are again closed to energize the relay RE and close the relay contacts RE1 (line 46), RE2 (line 23) and RE3 (line 31). The flame unit relay RF (line 46) remains de-energized at this point, however, because of the now open contacts RQ7 of the stop relay RQ. The closing of the contacts RE2 completes a circuit through the limit switch LS and the now closed contacts PQ3 and RR3 to the motor winding 28b, and the motor 28 is thus actuated to close the awning 26 (FIGURE 1). As the awning begins its movement, the limit switch LS2 (line 13) opens to de-energize the relay RB. The relay contacts RB1 (line 7) thereupon open to maintain the timer TA inactive, the contacts RB2 (line 18) open to stop the fog solution pump motor 82 and the hydraulic pump motor 83, and the contacts RB3 (line 30) open to disconnect the blower 35 (line 33) and to close the water valve 89 (line 35). As the blower 35 stops, it opens the contacts 87 (line 87) to shut down the water pump motor 88.

At the time the awning 26 reaches its fully closed position, the limit switch LS (line 23) is opened to deenergize the awning motor 28. Simultaneously, an additional limit switch LS10 (line 14) is closed to energize a timer TG through the now closed contacts RQ8 of the relay RQ.

As the timer TG begins to cycle, it momentarily closes the timer contacts TG1 (line 26). As indicated heretofore, the relay RL (line 54) was actuated when the burner for the fogger 32 was ignited. The relay RL includes normally closed contacts RL1 (line 26) and RL2 (line 29) and normally open contacts RL3 (line 27) and RL4 (line 27) which change condition upon the energization of the relay. When the timer contacts TG1 close, a circuit is completed through the relay contacts RL3 to supply an energizing current pulse to the unlatch winding RPU of a sequence relay RP. The sequence relay also includes a latch winding RPL (line 26) which was similarly pulsed upon the preceding closure of the awning 26. At the time either of these windings receives a current pulse, four sets of contacts RP1 (line 32), RP2 (line 46), RP3 (line 38) and RP4 (line 58) change condition. Thus, the pulsing of the winding RPU is effective to open the contacts RP1 and RP2, thereby rendering the circuitry for the fogger 32 inactive, and to close the contacts RP3 and RP4 to set up the apparatus for operation through the use of the fogger 33 and its associated burner. When the timer TG completes its cycle, it momentarily opens timing contacts TG2 (line 10) to break the circuit for the stop relay RQ and shut down the system.

Upon the succeeding actuation of the start button 77 (line 1), the operation of the apparatus is again initiated in a manner which is generally similar to that described heretofore. However, the sequence relay contacts RP1 and RP2 are now in their open condition, while the contacts RP3 and RP4 are closed, thereby arranging the apparatus for operation through the use of the fogging unit 33 and the corresponding burner. The major portion of the circuitry for the fogger 33 is shown in FIGURE 6B, lines 39–41, and is identical in several respects to the circuitry for the fogger 32 (lines 32–35) described above. Similarly, the majority of the corresponding burner control circuitry is shown in FIGURE 6C, lines 54–60, and is substantially the same as the circuitry (lines 45–54) for the fogger 32. To facilitate an understanding of the operation of the apparatus using the fogger 33, the individual circuit components therefor have been identified in the drawings by the same reference character as that used for the fogger 32 circuitry followed by a prime ('). For example, with the fogger 33 in operation the apparatus uses a blower timer TB' and an associated pressure switch PS1' (line 41) rather than the timer TB and the switch PS1 (line 32), a purge timer relay RD' and an associated pressure switch PS3' (line 94) rather than the relay RD and the switch PS3 (line 93), a water valve relay RC' (line 92) rather than relay RC (line 88), a water pump motor 88' and an associated switch 87' (line 91) rather than the motor 88 and the switch 87 (line 87), a water valve 89' (line 39) rather than the valve 89 (line 35), a pilot flame relay RH' (line 55) rather than the relay RH (line 49), an ignition transformer 94' (line 58) rather than the transformer 94 (line 51), a pilot gas valve 93' (line 56) rather than the valve 93 (line 50), a main gas valve 97' (line 57) rather than the valve 97 (line 52), a relay RK' (line 59) rather than the relay RK (line 53), the relay contact RK2' and the associated fog valve 102' (line 90) rather than the contacts RK2 and the valve 102 (line 89), and a relay winding RL' (line 60) rather than the winding RL (line 54) which similarly controls the contacts RL1, RL2, RL3 and RL4 (lines 26–29). The steam timer TD (line 61) is used with both foggers, and its operation with the fogger 33 is similar to that discussed heretofore.

Successive vortex rings are automatically produced through the use of the fogger 33 until the actuation of the stop button 115 (line 10). As the apparatus shuts down, it is again in condition for operation through the use of the fogger 32 upon the succeeding actuation of the start button.

In the event of a malfunction of the apparatus, it is arranged to automatically shut itself off and to switch over for operation with a fogger other than the one then in use. As indicated heretofore, during the normal operating cycle the steam timer TD (line 61) is actuated upon the successful ignition of the fogging unit then in use to open its normally closed contacts TD1 (line 8) and thereby disconnect the start cycle timer TA (line 7). If the starting cycle is interrupted by any component failing to start, however, the contacts TD1 remain closed to permit the timer TA to continue to time until it reaches a predetermined setting which is sufficient for normal starting. As the timer TA reaches this setting, it closes normally open timer contacts TA2 (line 9) to connect the winding of a rely RS across the conductors 75 and 76. The relay RS includes normally closed contacts RS1 (line 1) which open upon energization of the relay to break the circuit for the start relay RA and the lamps 78. Energization of the relay RS also is effective to close normally open contacts RS2 (line 4), thereby partially completing a circuit leading to a relay RT, and to close normally open contacts RS3 (line 28). Upon the closure of these latter contacts, either the latch winding RPL or the unlatch winding RPU of the sequence relay RP is energized, depending upon the condition of the relay contacts RL2 and RL4. Thus, if the apparatus had been operating to ignite the fogger 32, for example, the contacts RL2 would be closed and the contacts RL4 would be open, with the result that the closing of the contacts RS3 would energize the winding RPU to change the condition of the contacts RP1 (line 32), RP2 (line 46), RP3 (line 38) and RP4 (line 58) and thereby immediately prepare the circuit for the use of the fogger 33.

Following the de-energization of the start relay RA, the apparatus remains in its shut-off condition with the awning 26 open until the operator again pushes the start button 77 (line 1). Actuation of the button 77 completes a circuit for the winding of the relay RT (line 4) which extends from the conductor 75, the normally closed contacts RQ1, the start button 77, the now-closed contacts RS2 (line 4), the normally closed contacts RA5 of the relay RA and then across the relay winding RT to the conductor 76. Simultaneously, two lamps 117 (lines 5 and 6) are lighted to provide an indication that the apparatus is operating in its off-normal condition.

The off-normal relay RT includes normally-open contacts RT1 (line 5) and RT2 (line 31) and normally closed contacts RT3 (line 1) and RT4 (line 28). The closure of the contacts RT1 in response to the energization of the relay completes a holding circuit for the relay winding and the lamps 117 through the closed contacts RQ1 (line 1) and the conductor 80, while the closure of the contacts RT2 bridges the open relay contacts RA3 to energize the control circuit and thereby start the fogging unit selected by the off-normal condition. The apparatus thereupon continues to automatically produce successive vortex rings through the use of the selected fogger. The opening of the contacts RT3 prevents energization of the relay RA, and the opening of the contacts RT4 breaks the circuit through the relay contacts RS2 to the sequence relay windings RPL and RPU. Upon a succeeding actuation of the stop button 115 (line 10), the system shuts down in the manner described above, and the cause of the malfunction is then ascertained and corrected.

Under certain conditions, it is desirable to operate the apparatus through the exclusive use of the fogger 32, the exclusive use of the fogger 33, or with both foggers in operation simultaneously. This latter mode of operation is particularly effective in cases in which the density of the successive vortex rings is to be increased. To accomplish these modified forms of operation, there is provided a four-position, multicontact switch having contacts SB1 (line 84), SB2 (line 34), SB3 (line 48), SB4 (line 61), SB5 (line 40), SB6 (line 62) and SB7 (line 59). The individual positions of these contacts have been identified in FIGURE 6 by the reference numerals 1, 2, 3 and 4. With the contacts in the positions shown (position 1), the circuit is arranged for the automatic operation of the apparatus through the use of alternate foggers in the manner described heretofore.

Upon the movement of the multicontact switch to position 2, the contacts SB2, SB3 and SB4 are closed, while the remaining contacts SB1, SB5, SB6 and SB7 are in their open positions. The closing of the contacts SB2 (line 34) bypasses the relay contacts RO2 and RP1 to connect the fogger 32 in the circuit, while the closing of the contacts SB3 (line 48) similarly bypasses the relay contacts RO4 and RP2 (line 46) to connect in the corresponding burner control circuit. As the contacts SB4 (line 61) close, the steam timer TD is set up for operation irrespective of the condition of the relay contacts RO6.

In a similar manner, when the multicontact switch is in position 3, the apparatus is arranged to operate through the use of the fogger 33, and the fogger 32 is disconnected. Upon movement of the switch to this latter position, the contacts SB5 (line 40), SB6 (line 62) and SB7 (line 59) are closed, while the remaining contacts are in their open positions. The contacts SB5 and SB7 respectively connect the fogger 33 and its burner control in the circuit, and the contacts SB6 complete a circuit for the timer TD.

In cases in which the foggers 32 and 33 are to be operated simultaneously, the multicontact switch is moved to position 4 to close the contacts SB1 (line 84) and to open the remaining contacts. A relay RU is thereupon energized to close its contacts RU1 (line 35), RU2 (line 39), RU3 (line 47), RU4 (line 58) and RU5 (line 62) and thereby connect in both foggers and their burner control circuits. The arangement is such that both of the burner relay contacts RK1 (line 61) and RK1' (line 62) must be closed, indicating that both of the burners are lit, before the timer TD begins its cycle. For each successive ring vortex, the two fogging units 32 and 33 simultaneously introduce the fogging solution into the cylindrical enclosure 15 (FIGURE 1) at the appropriate point in the operation cycle.

In order to achieve an even higher propagation velocity and range for the ring vortex, as well as a higher rotational velocity within the ring, the pressure in the accummulator tanks 54 (FIGURE 2) is adjusted to provide more hydraulic power to the diaphragm 41. During high wind conditions, for example, the increased rotational velocity within the ring serves to minimize any adverse effect of the wind on the ring. To accomplish this adjustment, the operator of the apparatus actuates a button 120 (FIGURE 6A, line 15). The button 120 completes a circuit to a high wind valve 121 (line 16) and the winding of a relay RV. The valve 121 thereupon opens to admit additional fluid to the tanks 54, while the relay RV closes its normally open contacts RV1 (line 17) to complete a holding circuit across the button. The apparatus is returned to normal operation by means of a reset button 122 which breaks the holding circuit to close the valve and de-energize the relay.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. Apparatus for producing a ring vortex comprising, in combination, means defining an enclosure having a discharge orifice therein, a support member positioned within said enclosure for movement with respect thereto toward said orifice, a flexible diaphragm carried by said support member, a supply of vortex producing material, means for inserting said material into said enclosure, and means for moving said support member toward said orifice and for thereafter abruptly arresting said support member, to thereby flex said diaphragm and expel said material from said orifice in the form of a ring vortex.

2. Apparatus for producing a ring vortex comprising, in combination, means defining an enclosure having a discharge orifice therein, a support member positioned within said enclosure for movement in a linear direction with respect thereto toward said orifice, a flexible diaphragm carried by said support member, a supply of vortex producing material, means for inserting said material into said enclosure, and means responsive to the insertion of said material for moving said support member toward said orifice and for thereafter abruptly arresting said support member, to thereby flex said diaphragm and expel said material from said orifice in the form of a ring vortex.

3. Apparatus for producing a ring vortex comprising, in combination, means defining an enclosure having a substantially circular orifice therein, a support member positioned within said enclosure for movement in a linear direction with respect thereto toward said orifice, a flexible diaphragm carried by said support member, a supply of vortex producing material, means for inserting said material into said enclosure, means responsive to the insertion of said material for moving said support member toward said orifice, and shock absorbing means for engaging the moving support member to abruptly arrest the same, to thereby flex said diaphragm and expel said material from said orifice in the form of a ring vortex.

4. Apparatus for producing a ring vortex comprising, in combination, means defining an enclosure having a substantially circular sharp-edged orifice therein, a support member positioned within said enclosure for movement with respect thereto from an initial position toward said orifice, a flexible diaphragm carried by said support member, a supply of vortex producing material, means for inserting said material into said enclosure, means responsive to the insertion of said material for moving said support member toward said orifice, shock-absorbing means for engaging the moving support member to abruptly arrest the same, to thereby flex said diaphragm and expel said material from said orifice in the form of a ring vortex, and means operable in response to the arrest of said support member for automatically returning said member to said initial position.

5. Apparatus for producing a ring vortex comprising, in combination, means defining an enclosure having a substantially circular orifice therein, a support member positioned within said enclosure for movement in a linear direction with respect thereto from an initial position toward said orifice, a flexible diaphragm carried by said support member, a supply of vortex producing material, means for inserting said material into said enclosure between said diaphragm and said orifice, operating means responsive to the insertion of said material for moving said support member toward said orifice, means including a plurality of shock absorbers mounted within said enclosure for engaging the moving support member to abruptly arrest the same, to thereby flex said diaphragm and expel said material from said orifice in the form of a ring vortex, means for returning said support member to said initial position, and means cooperating with said returning means for preventing operation thereof until each of said shock absorbers is in engagement with said support member.

6. Apparatus for producing a ring vortex comprising, in combination, means defining an enclosure of generally cylindrical configuration, said enclosure having a substantially circular orifice therein, annular support means coaxially positioned within said enclosure for movement with respect thereto toward said orifice, a flexible diaphragm carried by said support means, generating means supported adjacent said enclosure for generating a supply of vortex producing material and for inserting said material into said enclosure, fluid operated means cooperating with said support means for moving the same in an axial direction toward said orifice, and means for engaging the moving support means to abruptly arrest the same, to thereby flex said diaphragm and expel said material from said orifice in the form of a ring vortex.

7. Apparatus of the character set forth in claim 6, in combination, means cooperating with said enclosure and movable between an open position and a closed position for covering said orifice, said generating means being automatically responsive to the movement of said last-mentioned means to said open position to generate said material and to insert the same into said enclosure.

8. Apparatus for producing a ring vortex comprising, in combination, means defining an enclosure of generally cylindrical configuration, said enclosure being open at one end and being provided adjacent the other end with an end wall having a substantially circular orifice therein, a support member positioned within said enclosure for movement with respect thereto toward said orifice, a circular flexible diaphragm carried by said support member, means supported adjacent said enclosure for generating a supply of vortex producing material and for inserting the same therein, fluid operated means responsive to the insertion of said material into said enclosure for moving said support member in an axial direction toward said orifice, to similarly move said flexible diaphragm, and means for abruptly arresting the movement of said support member, to thereby flex said diaphragm and expel said material from said orifice in the form of a ring vortex.

9. Apparatus for producing a ring vortex comprising, in combination, means defining an enclosure of generally cylindrical configuration, said enclosure being open at one end and being provided at the other end with an end wall having a substantially circular orifice therein, a ring-shaped member coaxially positioned within said enclosure for movement with respect thereto toward said orifice, a circular flexible diaphragm extending across said ring-shaped member, said diaphragm being affixed adjacent its periphery to said ring-shaped member, means supported adjacent said enclosure for generating a supply of vortex producing material and for inserting the same therein, hydraulic means responsive to the insertion of said material into said enclosure for moving said ring-shaped member in an axial direction toward said orifice, to similarly move said flexible diaphragm, and means for abruptly arresting the movement of said ring-shaped member, to thereby flex said diaphragm and expel said material from said orifice in the form of a ring vortex.

10. Apparatus for producing a ring vortex comprising, in combination, means defining an enclosure of generally cylindrical configuration, said enclosure being open at one end and being provided adjacent the other end with an end wall having a substantially circular orifice therein, a support member positioned within said enclosure for movement with respect thereto from an initial position toward said orifice, said flexible diaphragm carried by said support member, means supported adjacent said enclosure for generating a fog and for periodically inserting the same therein, means responsive to the insertion of fog into said enclosure for moving said support member toward said orifice, to similarly move said flexible diaphragm, shock absorbing means for abruptly arresting the movement of said support member, to thereby flex said diaphragm and expel said fog from said orifice in the form of a ring vortex, and means operable in response to the arrest of said support member for automatically returning said member to said initial position.

11. Apparatus for forming a ring vortex comprising, in combination, means defining an enclosure of generally cylindrical configuration, said enclosure being open at one end and being provided at the other end with an end wall having a substantially circular orifice therein, piston means positioned within said enclosure for movement with respect thereto from an initial position toward said orifice, means supported adjacent said enclosure for generating a fog and for inserting the same therein, means cooperating with said piston means for moving the same from said initial position toward said orifice, to thereby expel said fog therefrom in the form of a ring vortex, means including a plurality of shock absorbers mounted within said enclosure for engaging the moving piston means to abruptly arrest the same, means for returning said piston means to said initial position, and means operable only in response to the return of said piston means to said initial position for conditioning the apparatus for the formation of a succeeding ring vortex.

12. Apparatus for producing a ring vortex comprising, in combination, means defining an enclosure of generally cylindrical configuration, said enclosure being open at one end and being provided at the other end with an end wall having a substantially circular sharp-edged orifice therein, a ring-shaped member coaxially positioned within said enclosure for movement with respect thereto toward said orifice, a circular flexible diaphragm extending across said ring-shaped member, said diaphragm being affixed adjacent its periphery to said ring-shaped member, means supported adjacent the exterior of said enclosure for generating a fog and for periodically inserting the same therein, hydraulic means responsive to each insertion of fog into said enclosure for moving said ring-shaped member in an axial direction toward said orifice, to similarly move said flexible diaphragm, and shock absorbing means for abruptly arresting the movement of said ring-shaped member, to thereby flex said diaphragm and expel said fog from said orifice in the form of a ring vortex.

13. Apparatus of the character set forth in claim 12, in combination, said ring-shaped member being repeatedly movable from an initial position toward said orifice, to expel successive ring vortices therefrom, means responsive to the production of each of said vortices for automatically returning said ring-shaped member to said initial position, and means operable only in response to the return of said ring-shaped member to said initial position for actuating the generating means to insert fog into said enclosure preparatory to the production of a succeeding ring vortex.

14. Apparatus of the character set forth in claim 12, in combination, said generating means including a first and a second fog generating unit, said fog generating units being operable at different times to insert fog into said cylindrical enclosure.

15. Apparatus of the character set forth in claim 14, in combination, circuit means for automatically actuating said first fog generating unit to periodically insert fog therefrom into said cylindrical enclosure and for thereafter automatically actuating said second fog generating unit to periodically insert fog therefrom into said enclosure.

16. Apparatus for producing a ring vortex comprising, in combination, means defining an enclosure of generally cylindrical configuration, said enclosure having a substantially circular orifice therein, piston means positioned within said enclosure for movement with respect thereto toward said orifice, means including a plurality of generating units supported adjacent said enclosure for generating a supply of vortex producing material and for inserting said material into said enclosure, means for controlling said generating units to selectively insert material from first one and then the other of said units, fluid operated means responsive to the insertion of said material for moving said piston means toward said orifice, to thereby expel said material therefrom in the form of a ring vortex, and means for engaging the moving piston means to abruptly arrest the same.

17. Apparatus for producing a ring vortex comprising, in combination, means defining an enclosure of generally cylindrical configuration, said enclosure having a substantially circular orifice therein, piston means coaxially positioned within said enclosure for movement with respect thereto from an initial position toward said orifice, means including a plurality of generating units supported adjacent said enclosure for generating a supply of vortex producing material and for inserting said material into said enclosure, circuit means for controlling said generating units to selectively insert material from first one and then the other of said units, fluid operated means cooperating with said piston means for moving the same in an axial direction from said initial position toward said orifice, to thereby expel said material from said orifice in the form of a ring vortex, means for returning said piston means to said initial position, and means operable only in response to the return of said piston means to said initial position for conditioning the apparatus for the formation of a succeeding ring vortex.

18. Apparatus of the character set forth in claim 17, in combination, each of said generating units being adapted to automatically insert material into said enclosure at periodic intervals.

19. Apparatus of the character set forth in claim 17, in combination, switching means cooperating with said circuit means for adjusting the same to simultaneously insert material from each of said generating units into said enclosure.

20. Apparatus for producing a ring vortex comprising, in combination, means defining an enclosure of generally cylindrical configuration, said enclosure being open at one end and being provided at the other end with an end wall having a substantially circular orifice therein, an annular support member coaxially positioned within said enclosure for movement with respect thereto from an initial position toward said orifice, a flexible diaphragm carried by said support member, generating means including a plurality of generating units supported adjacent said enclosure for generating wave producing material and for periodically inserting the same therein, circuit means for controlling said generating units to selectively insert material from first one and then the other of said units, means responsive to the insertion of material into said enclosure for moving said support member toward said orifice, to similarly move said flexible diaphragm, means including a plurality of shock absorbers mounted within said enclosure for engaging the moving support member to abruptly arrest the same, to thereby flex said diaphragm and expel material from said orifice in the form of a ring vortex, fluid operated means for returning said support member to said initial position, and means operable only in response to the return of said support member to said initial position for actuating said circuit means to insert material from said generating means into said enclosure preparatory to the formation of a succeeding ring vortex.

References Cited
UNITED STATES PATENTS

| | | | |
|---|---|---|---|
| 2,628,450 | 2/1953 | Shelton | 46—9 |
| 2,788,607 | 4/1957 | Ward | 46—9 |
| 3,272,510 | 9/1966 | Ohlund et al. | 272—8 |

EVERETT W. KIRBY, *Primary Examiner.*